United States Patent Office 3,478,102
Patented Nov. 11, 1969

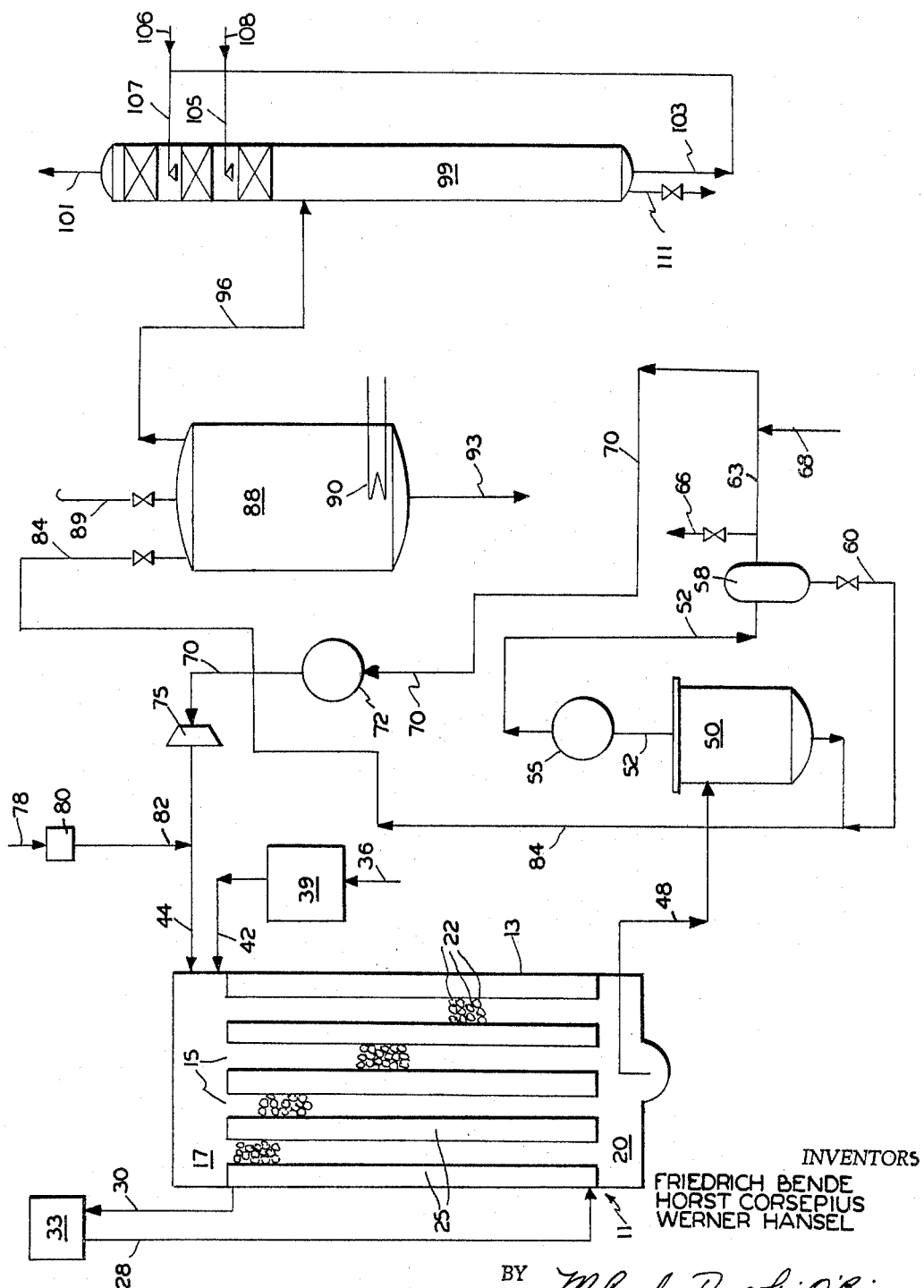

3,478,102
HEXAMETHYLENE DIAMINE MANUFACTURE
Friedrich Bende, Bergen-Enkheim, Horst Corsepius, Frankfurt am Main, and Werner Hansel, Bergen-Enkheim, Germany, assignors to Vickers-Zimmer Aktiengesellschaft Planung und Bau von Industrieanlagen, Frankfurt am Main, Germany, a corporation of Germany
Filed June 14, 1966, Ser. No. 561,311
Int. Cl. C07c 87/14, 85/12
U.S. Cl. 260—583
6 Claims

ABSTRACT OF THE DISCLOSURE

A process for completely hydrogenating adiponitrile to hexamethylenediamine in high yield, comprising contacting liquid adiponitrile at a pressure greater than about 150 atmospheres and a temperature of about 60 to 135° C. with hydrogen and ammonia in an elongated reaction zone containing a solid hydrogenation catalyst. At least about 0.4 moles $H_2$ per mole adiponitrile multipled by diameter of reaction zone in millimeters is fed as a mixture containing about 5–20% by volume as measured in the gas phase. Adiponitrile is fed to the reaction zone at a rate in kilograms per hour no greater than about the length of the reaction zone expressed in meters and divided by 18.

---

This invention pertains to the conversion of adiponitrile to hexamethylene diamine by contact of liquid adiponitrile with a catalyst and gaseous hydrogen in a narrow elongated reaction zone. The invention is directed in particular to the reaction method and to a catalyst useful in this reaction. In the process of this invention, high conversion of the adiponitrile is accomplished and by-product formation is suppressed.

While hexamethylenediamine suitable for use in nylon production is currently being manufactured on a commercial scale by hydrogenation of adiponitrile, the processes currently used, for example, as described in U.S. Patent 2,284,525, have a number of undesirable features. For one thing, the crude hydrogenation product contains besides adiponitrile the undesired epsilon-aminocapronitrile which cannot be easily separated by single distillation and thus requires rectification. Further, the use of great excesses of ammonia in known reactions burdens the system unduly, requiring larger equipment and a larger capital investment, to get good results, than is now found necessary. Further, processes which employ a great deal of ammonia, say, more than about 20% ammonia in the hydrogen recycle stream, often encounter problems of ammonia condensation in the stream, which may clog the equipment.

In this invention, liquid adiponitrile is contacted at a pressure greater than 150 atmospheres with gaseous hydrogen and ammonia. The pressure may be as high as 500 atmospheres or more and the temperature is about 60 to 125° C., preferably about 90 to 110° C. In the reaction, ammonia and hydrogen are usually present in a ratio of about 150 moles hydrogen to about 9 moles ammonia to one mole of adiponitrile. The minimum amount of hydrogen necessary for use to get high yields of hexamethylene diamine with any particular catalyst system depends upon the dimensions of the reactor: with a reactor having diameter of 30 mm., 75 moles of hydrogen need to be supplied per mole of adiponitrile; with a diameter of 60 mm., 150 moles hydrogen have been found necessary per mole of adiponitrile; a tube diameter of about 100 mm. requires a minimum molar ratio of hydrogen to adiponitrile of about 250/1. Thus, the amount of hydrogen needed can be calculated by the empirical formula:

$$\text{moles } H_2 \geq \frac{\text{diameter of tube (in mm.)} \times \text{moles adiponitrile}}{0.4}$$

While there is no substantial effect upon yield caused by using too much hydrogen, the practical maximum, in order not to overload the equipment will ordinarily be about twice the minimum ratio.

Since the adiponitrile conversion reaction is conducted at a pressure higher than the critical pressure of ammonia, this component of the reaction mixture is in the liquid phase during the hydrogenation, however, it is usually supplied to the reaction as a vapor mixture with hydrogen passing to the reactor. This gaseous mixture, it has been found, requires much less ammonia than the art has heretofore found necessary. Generally, the gaseous mixture will contain about 5 to 20%, preferably about 5 to 10% ammonia by volume. It has been found that a less ammonia content in the hydrogenating gas, say about 1 to 4% will, under the same conditions, give a much lower yield of hexamethylene diamine while an amount higher than about 7% will have no influence on the yield.

In order to maximize yields of hexamethylene diamine in the desirable narrow reaction zone, the reaction zone needs a minimum length, which may vary depending upon the rapidity of conversion desired. Suitable conversion can be obtained in a reactor tube about 2.5 meters long when about 0.14 kg. adiponitrile are fed per hour. About 0.20 kg. adiponitrile may be processed per hour in a tube about 3.5 meters long while a 5.5 meter length is required to adequately process about 0.31 kg. per hour of adiponitrile. The minimum tube length may thus be approximated as meters length=18×kilograms adiponitrile per hour.

With the minimum desirable parameters for the reaction bed and reaction mixture components discovered, as described above, it becomes apparent that a plurality of tubes filled with catalyst forms the most desirable reactor apparatus. The tubes, formed into a bundle, may be contained within a larger vessel, which ideally can be pressurized to avoid undue internal strain on the tubes during the high pressure reaction. Since the hydrogenation reaction is notoriously exothermic, a cooling medium is desirably circulated through the vessel which surrounds the reactor tube bundle. This cooling fluid advantageously is methanol.

Known processes for conversion of adiponitrile to hexamethylene diamine employ known hydrogenation catalysts for the reaction. In this invention, it has been found that silver-promoted cobalt manganese catalyst gives improved yields of the desired product. The catalyst generally comprises about 20 to 27% cobalt, 5 to 10% manganese and about 0.05 to 1% silver on a particulate solid support, the promoting metals being generally in the metallic state. Suitable supports include pumice stone and other essentially siliceous solids, preferably of a particle size range of about 1 to 11 millimeters. Generally, the catalyst will have a total content of promoting metals of about 30% by weight.

The catalyst may conveniently be made by dissolving in water the nitrates or other heat decomposible water-soluble salts of the promoting metals in the desired proportions. The support material may then be impregnated with the solution and heated to about 130° C. to dry the catalyst and then to about 300 to 400° C. to decompose the salts. It is advantageous to convert the promoting metals to the metallic form by reduction in a hydrogen stream at about 350° C. To avoid pyrophoric qualities in the catalyst, it may be treated with $CO_2$ to remove entrained hydrogen and with an inert gas such as nitrogen, perhaps containing a small amount of oxygen.

As described above, the reactor generally will comprise a bundle of tubes contained within a heat-exchange type vessel provided with means for introducing a heat-exchange fluid. Means also will be provided for separating gaseous components from the generally liquid product mixture and for recycle of the gases. Since some gas-phase inert by-products are contained in the hydrogen, an unwarranted build-up in such components may be prevented by venting a portion of the recycling hydrogen and by introduction of fresh hydrogen to make up for this loss as well as the hydrogen consumed in the reaction. An inert gas level of 10% by volume of the hydrogen can be tolerated. Ammonia which separates from the recycle gas stream can be used in the hydrogenation step again or may be used in other procedures, e.g., adiponitrile manufacture by amidation and dehydration of adipic acid.

The invention will be more readily understood by reference to the accompanying drawing the sole figure of which represents a schematic of apparatus which may be employed in the process of this invention.

In the drawing 11 represents, in general, the reactor employed in this invention. This reactor usually comprises an outer vessel 13 containing a plurality of tubes 15 which, as shown, are advantageously vertically disposed. The tubes are in communication with header 17 and sump 20 of the reactor 11 and contain elongated fixed beds of catalyst particles 22. The free spaces 25 thus are left for circulation of a heat exchange fluid such as methanol from the inlet feed line 28 and to the outlet line 30 and cooler 33. The cooler 33, in the case of methanol, also will serve to condense methanol vapors arriving by line 30. The cooler 33 may also include a pump for positive recirculation of the methanol, perhaps under pressure.

Adiponitrile is fed by line 36, heater 39 and line 42 to the header 17 of reactor 11. This adiponitrile, preferably pressurized to the pressure of the reaction, is thus allowed to trickle over the particulate catalyst 22 in the tubes 15. A mixture of hydrogen and ammonia from line 44 passes also into the header 17 and tubes 15. The reacted mixture gathers in the sump 20 and is conducted away by line 48 to the hot separator tank 50.

In the separator tank 50, the reaction product mixture is allowed to separate into a liquid and a gas phase, advantageously with little reduction in pressure from that of the reaction. The gas phase, comprising mostly hydrogen with some inerts passes by line 52 through cooler 55 to the separator 58. In this separator, the components of the gas mixture which have liquified due to the temperature change are disentrained from the remaining gas and conducted by lines 60 and 84 to the vessel 88. In passing through line 63, line 66 is provided for venting the amount of gas needed to keep the inerts below the 10% tolerance. Fresh make-up hydrogen is added by line 68 and the resulting mixture conducted by line 70 through the heater 72 and compressor 75 to line 44 for reentry to the reactor 11. Make-up ammonia from source 78 is brought up to reaction pressure by compressor 80 for passage through line 82 to the recycle hydrogen stream. Compressor 80 is preferably a positive displacement pump for accurate control of the amount of ammonia added. Likewise, make-up hydrogen source 68 may be provided with a positive displacement pump (not shown).

Liquid product from separators 50 and 58 is taken by line 84 to the flash tank 88 where, at a pressure approaching atmospheric, the liquid reaction product is further degassed. Vent 89 and heat exchange coil 90 may be provided for vessel 88 for more thorough gas disentrainment. Crude hexamethylene diamine product is removed by line 93 to purification and/or use.

Gases removed from the liquid product pass out by line 96 to gas scrubber column 99. This gas mixture comprises mostly ammonia and traces of hydrogenation reactor products. In this column the gas mixture is contacted with water fed in by lines 106 and 108 which acts as a scrubbing medium for the ammonia. Unabsorbed ammonia is removed from the system by line 101. Aqueous ammonia is recycled by lines 103, 105 and 107 to the colun 99. Line 111 is provided for removal of aqueous ammonia, containing crude reaction products from the bottom of column 99.

The following examples serve to illustrate the process of this invention.

A reactor having 26 tubes, each 30 mm. in diameter by 5.5 meters in length was employed in the following examples.

In Example I, the tubes were filled with a catalyst, prepared as described above, having about 23% cobalt, about 7% manganese and about 0.3% silver, on pumice stone having a size range of 4 to 6 mm. A reaction mixture having about 9 moles ammonia and 150 moles hydrogen per mole of liquid adiponitrile was passed to the reactor at a rate of about 12.6 kg./hr. and at 300 atmospheres pressure. Methanol was circulated on the outside of the tubes to keep the reaction temperature at about 115° C. From this reaction, a crude hexamethylene diamine was obtained containing about 95 to 96% of the desired products, the other components, besides ammonia, being hexamethyleneimine, 1,2 - diaminocyclohexane, 6,6' - diaminohexylamine and other high boilers.

Further runs were made in which the same apparatus and reaction conditions were employed but in which the Co-Mn-Ag catalyst was replaced by other materials. The results of these runs are given in Table I below. In all but runs V and VII, the promoting metals were contained on pumice stone.

TABLE I

| Run | Catalyst | Yield of hexamethylenediamine (percent) |
| --- | --- | --- |
| I | 23% Co, 7% Mn, 0.3% Ag | 95–96 |
| II | 23% Co, 7% Cu | 92 |
| III | 23% Co, 7% Mn | 92–93 |
| IV | 23% Co, 7% Cr | 92 |
| V | 100% $Fe_3O_4$ | 60–70 |
| VI | 23% Co, 7% V | 85 |
| VII | Lumpy Raney cobalt | 88 |

What is claimed is:

1. A process for the production of hexamethylenediamine by the liquid phase hydrogenation of adiponitrile comprising contacting adiponitrile with hydrogen and ammonia at a temperature of about 60 to 135° C. and a pressure of about 150 to 500 atmospheres in an elongated reaction zone containing a solid hydrogenation catalyst, wherein (a) the hydrogenation catalyst consists essentially of a silver-promoted cobalt manganese catalyst;

(b) the amount of hydrogen fed to the reaction zone is at least about 0.4 mole of hydrogen per mole of adiponitrile multiplied by the diameter of the reaction zone in millimeters;

(c) the hydrogen being fed contains about 5 to 20 volume percent ammonia as measured in the gas phase;

(d) the minimum length of said reaction zone in meters being 18 multiplied by the kilograms of adiponitrile fed per hour.

2. The process of claim 1 in which the hydrogen feed contains about 5 to 10% ammonia as measured in the gas phase.

3. The process of claim 1 in which hydrogen, ammonia and adiponitrile are present in the reaction zone in a ratio of about 150 moles hydrogen per 9 moles of ammonia per mole of adiponitrile.

4. The method of claim 1 in which a plurality of reaction zones are employed in parallel.

5. The method of claim 1 in which menthanol is passed in indirect heat exchange with the reaction zones.

6. The method of claim 1 in which the catalyst contains about 20 to 27% cobalt, 5 to 10% manganese and about 0.05 to 1% silver in the metallic form on a solid support.

References Cited

UNITED STATES PATENTS

| | | |
|---|---|---|
| 2,200,282 | 5/1940 | Lazier. |
| 2,284,525 | 5/1942 | Larchar et al. |
| 2,504,024 | 4/1950 | Howk et al. |

CHARLES B. PARKER, Primary Examiner

R. L. RAYMOND, Assistant Examiner

U.S. Cl. X.R.

252—471